(12) United States Patent
Xu et al.

(10) Patent No.: US 12,082,273 B2
(45) Date of Patent: Sep. 3, 2024

(54) METHODS FOR SERVICE TRANSMISSION, TERMINAL DEVICE AND AMF

(71) Applicant: GUANGDONG OPPO MOBILE TELECOMMUNICATIONS CORP., LTD., Dongguan (CN)

(72) Inventors: Yang Xu, Dongguan (CN); Jianhua Liu, Dongguan (CN)

(73) Assignee: GUANGDONG OPPO MOBILE TELECOMMUNICATIONS CORP., LTD, Dongguan (CN)

( * ) Notice: Subject to any disclaimer, the term of this patent is extended or adjusted under 35 U.S.C. 154(b) by 144 days.

(21) Appl. No.: 17/695,524

(22) Filed: Mar. 15, 2022

(65) Prior Publication Data

US 2022/0210849 A1  Jun. 30, 2022

Related U.S. Application Data

(63) Continuation of application No. PCT/CN2019/109224, filed on Sep. 29, 2019.

(51) Int. Cl.
*H04W 40/02* (2009.01)
*H04W 28/02* (2009.01)
(Continued)

(52) U.S. Cl.
CPC ....... *H04W 76/12* (2018.02); *H04W 28/0268* (2013.01); *H04W 40/02* (2013.01); *H04W 60/005* (2013.01); *H04W 84/045* (2013.01)

(58) Field of Classification Search
CPC ............. H04W 76/12; H04W 28/0268; H04W 40/02; H04W 60/005; H04W 84/045; H04W 8/20; H04W 74/08
See application file for complete search history.

(56) References Cited

U.S. PATENT DOCUMENTS

2020/0252856 A1\* 8/2020 Zhu ................. H04W 40/02
2020/0351980 A1\* 11/2020 Talebi Fard .......... H04W 68/00
2022/0104308 A1\* 3/2022 Talebi Fard ............ H04W 4/90

FOREIGN PATENT DOCUMENTS

| CN | 109922472 A | 6/2019 |
|---|---|---|
| CN | 110225563 A | 9/2019 |
| WO | 2019085918 A1 | 5/2019 |

OTHER PUBLICATIONS

Qualcomm (FS_Vertical_LAN: Access to PLMN/NPN services via N3IWF, Oct. 2018).*

(Continued)

*Primary Examiner* — Lakeram Jangbahadur
(74) *Attorney, Agent, or Firm* — Sheppard, Mullin, Richter & Hampton LLP

(57) ABSTRACT

Embodiments of the present disclosure provide a method for service transmission, and a terminal device. The method includes performing, by a terminal device, a registration and a Non Public Network (NPN) Protocol Data Unit (PDU) session establishment on an NPN; performing, by the terminal device, a tunnel establishment with a non-3rd Generation Partnership Project Interworking Function (N3IWF) through the NPN PDU session; and transmitting, by the terminal device, first indication information to an Access and Mobility Management Function (AMF) in a Public Land Mobile Network (PLMN) via the N3IWF during a registration to the AMF through the tunnel. The first indication information contains NPN identifier information as PLMN Identifier (PLMN ID)+Network Identifier (NID).

16 Claims, 8 Drawing Sheets

(51) Int. Cl.
*H04W 60/00* (2009.01)
*H04W 76/12* (2018.01)
*H04W 84/04* (2009.01)

(56) References Cited

OTHER PUBLICATIONS

International Search Report and Written Opinion dated May 27, 2020 in International Application No. PCT/CN2019/109224. English translation attached.

Qualcomm Incorporated et al. "FS Vertical_ LAN: Access to PLMN/NPN services via N3IWF", SA WG2 Meeting #S2-129 S2-1810074, Oct. 19, 2018 (Oct. 19, 2018), part 6, 9 pages.

* cited by examiner

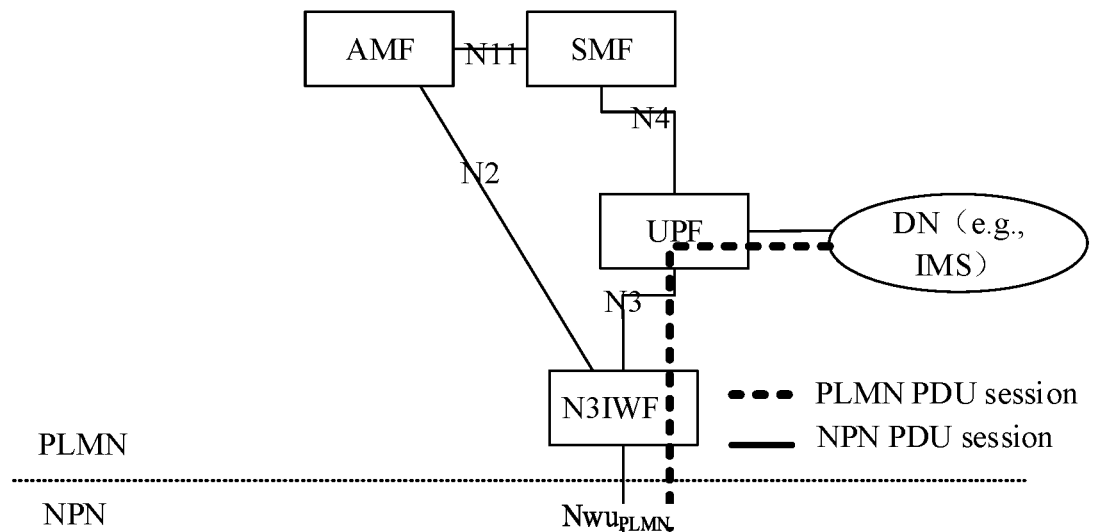

Obtaining, by a terminal device, first policy information and second policy information, wherein the first policy information is used for transmitting first service data in a session established between the terminal device and a first core network element, the second policy information is used for transmitting second service data in a session established between the terminal device and a second core network element, and transmission nodes of the session established between the terminal device and the second core network element comprise the first core network element

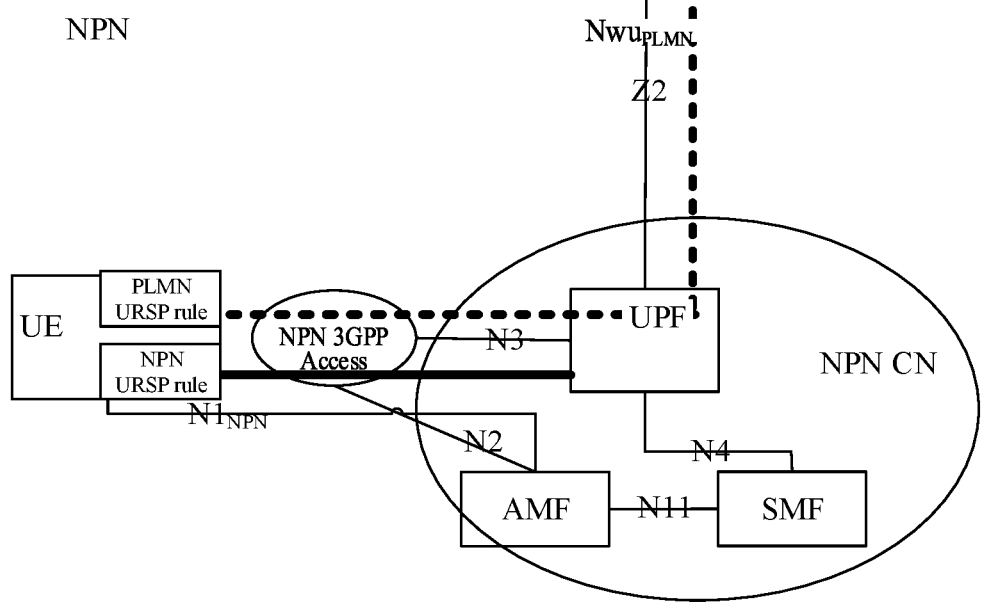

FIG. 4A

METHODS FOR SERVICE TRANSMISSION, TERMINAL DEVICE AND AMF

CROSS-REFERENCE TO RELATED APPLICATIONS

The present application is a continuation of International Application No. PCT/CN2019/109224 filed on Sep. 29, 2019, which is hereby incorporated by reference in its entirety.

TECHNICAL FIELD

Embodiments of the present disclosure relate to the field of mobile communication technologies, and more particularly, to methods for service transmission, a terminal device and an Access and Mobility Management Function (AMF).

BACKGROUND

Generally, a terminal device performs service transmission via a public network (i.e., a Public Land Mobile Network (PLMN)). However, in some scenarios, for the sake of effective and safe management, some local users or administrators deploy a local network (i.e., a private network).

The private network is also called a Non Public Network (NPN). In the NPN, some services may not be supported. In this scenario, the terminal device needs to access the PLMN for specific service transmission, and thus the terminal device needs to access the PLMN via the NPN. Therefore, there may be a situation where service data of the NPN and the PLMN coexist. However, there is currently no effective mechanism to control the transmission of traffic.

SUMMARY

Embodiments of the present disclosure provide methods for service transmission, a terminal device and an AMF.

In a first aspect, a method for service transmission is provided. The method includes performing, by a terminal device, a registration and a Non Public Network (NPN) Protocol Data Unit (PDU) session establishment on an NPN; performing, by the terminal device, a tunnel establishment with a non-3rd Generation Partnership Project Interworking Function (N3IWF) through the NPN PDU session; and transmitting, by the terminal device, first indication information to an Access and Mobility Management Function (AMF) in a Public Land Mobile Network (PLMN) via the N3IWF during a registration to the AMF through the tunnel. The first indication information contains NPN identifier information as PLMN Identifier (PLMN ID)+Network Identifier (NID).

In a second aspect, a method for service transmission is provided. The method includes receiving, by an Access and Mobility Management Function (AMF) in a Public Land Mobile Network (PLMN), first indication information from a terminal device via a non-3rd Generation Partnership Project Interworking Function (N3IWF) during a registration of the terminal device to the AMF through a tunnel. The first indication information contains Non Public Network (NPN) identifier information as PLMN Identifier (PLMN ID)+Network Identifier (NID), The tunnel is established between the terminal device and the N3IWF through an NPN Protocol Data Unit (PDU) session. The NPN PDU session is established through a registration and an NPN PDU session establishment by the terminal device on an NPN.

In a third aspect, a terminal device is provided. The terminal device includes a processor, and a memory for storing a computer program. The processor is configured to invoke and run the computer program stored in the memory to perform the above method for service transmission in the first aspect.

In a fourth aspect, an AMF is provided. The AMF includes a processor, and a memory for storing a computer program. The processor is configured to invoke and run the computer program stored in the memory to perform the above method for service transmission in the second aspect.

BRIEF DESCRIPTION OF DRAWINGS

The accompanying drawings described here are used to provide a further understanding of the present disclosure and constitute a part of the present disclosure. Exemplary embodiments of the present disclosure and description thereof are used to explain the present disclosure, and do not constitute an improper limitation of the present disclosure. The accompanying drawings are as follows.

FIG. 3 is a flowchart illustrating a method for service transmission according to an embodiment of the present disclosure.

FIG. 4A is a schematic diagram showing traffic control based on a User equipment Route Selection Policy (URSP) rule according to an embodiment of the present disclosure.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Long Term Evolution (LTE) system, an LTE Frequency Division Duplex (FDD) system, an LTE Time Division Duplex (TDD) system, a 5-th Generation (5G) communication system, a future communication system, and the like.

Figure 1:
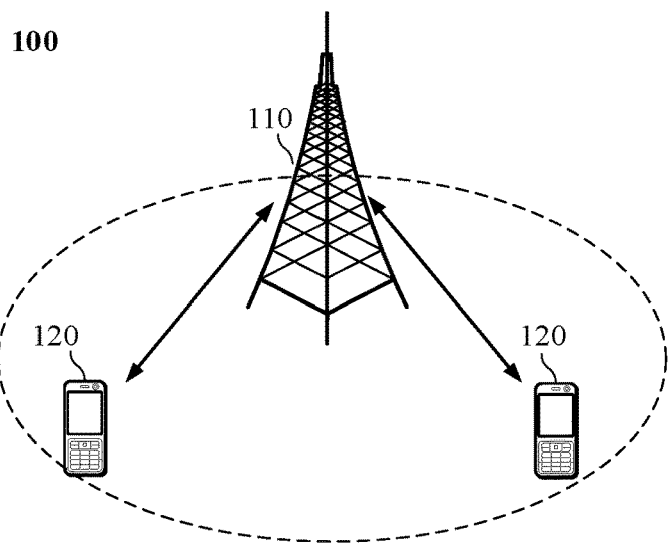
FIG. 1 is a schematic diagram showing a communication system architecture according to an embodiment of the present disclosure.

Exemplarily, a communication system 100 in which an embodiment of the present disclosure is applied is as illustrated in FIG. 1. The communication system 100 may include a network device 110. The network device 110 may be a device that communicates with a terminal 120 (or called a communication terminal or a terminal). The network device 110 may provide communication coverage for a specific geographic region, and may communicate with a terminal located in the coverage region. In at least one embodiment, the network device 110 may be an Evolutional Node B (eNB or eNodeB) in an LTE system or a wireless controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage region of the network device 110. The "terminal" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another terminal; and/or an Internet of Things (IoT) device. A terminal configured to communicate through the wireless interface may be referred to as a "wireless communication terminal", a "wireless terminal", or a "mobile terminal". Examples of the mobile terminal include, but are not limited to, a satellite or a cellular phone, a Personal Communication System (PCS) terminal that may combine a cellular radiotelephone with capabilities such as data processing, facsimile and data communication, a Personal Digital Assistant (PDA) that may include a radiotelephone, a pager, an Internet/intranet access, a Web browser, a notepad, a calendar, and/or a Global Positioning System (GPS) receiver, and a conventional laptop and/or palmtop receiver, or other electronic devices including a radiotelephone transceiver. The terminal can refer to an access terminal, a User Equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal in a Fifth Generation (5G) network, or a terminal in the future evolved PLMN, etc.

In at least one embodiment, direct communication, such as Device to Device (D2D) communication, may be performed between the terminals 120.

In at least one embodiment, the 5G communication system or the 5G network may also be referred to as a New Radio (NR) system or an NR network.

FIG. 1 exemplarily illustrates one network device and two terminals. In at least one embodiment, the communication system 100 may include a plurality of network devices, and a coverage area of each network device may cover a different number of terminals. The embodiments of the present disclosure are not limiting in this regard.

In at least one embodiment, the communication system 100 may also include other network entities such as a network controller and a mobility management entity, and the embodiment of the present disclosure is not limiting in this regard.

It should be understood that, in the embodiment of the present disclosure, a device having a communication function in a network/system may be referred to as a communication device. Taking the communication system 100 illustrated in FIG. 1 as an example, communication devices may include the network device 110 and the terminals 120, each having a communication function. The network device 110 and the terminal 120 may be any of specific devices described above, and details thereof will be omitted here. The communication device may also include another device in the communication system 100, for example other network entities such as a network controller, a mobility management entity, etc., and embodiments of the present disclosure are not limiting in this regard.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

In order to facilitate the understanding of the technical solutions of the embodiments of the present disclosure, the technical solutions related to the embodiments of the present disclosure are described below.

Network elements in the NPN can exist independently of the PLMN. That is, the NPN has its own network elements, such as a Policy Control Function (PCF) network element, a Session Management Function (SMF) network element, an Access and Mobility Management Function (AMF) network element, and a Unified Data Management (UDM) network element. In addition, the NPN has its own root key, security algorithm, subscription information, policy information, etc., so as to achieve isolation from the PLMN.

Figure 2:
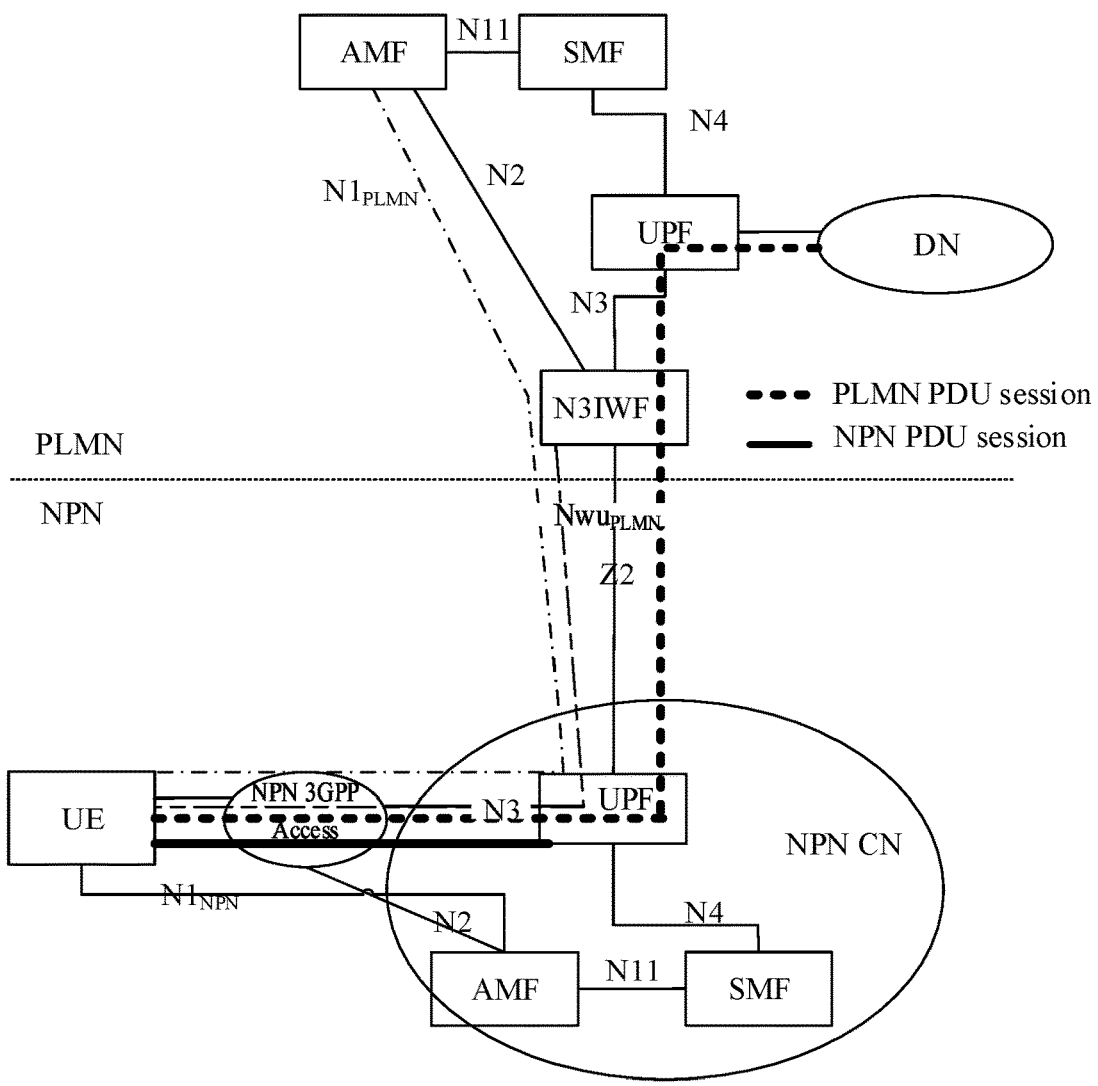
FIG. 2 is a first schematic diagram showing a User Equipment (UE) accessing a PLMN via an NPN according to an embodiment of the present disclosure.

The NPN may not support some services, such as IP Multimedia Subsystem (IMS) services. In this scenario, the terminal device needs to access the PLMN for specific services. As illustrated in FIG. 2, the UE accesses the PLMN via the NPN. An access network in the NPN is a 3rd Generation Partnership Project (3GPP) access network, and an access node in the PLMN is a non-3GPP Interworking Function (N3IWF) network element. Specifically, the UE establishes a channel with the N3IWF via the NPN to further realize the interaction between the UE and the network elements in the PLMN (such as the AMF and the UPF). In the architecture illustrated in FIG. 2, there is a situation where a Protocol Data Unit (PDU) session on the NPN side and a PDU session on the PLMN side work at the same time. That is, part of service data is transmitted in the PDU session on the PLMN side (hereinafter referred to as a PLMN PDU session for short), and another part of service data is transmitted in the PDU session on the NPN side (hereinafter referred to as an NPN PDU session for short). In at least one embodiment, NPN users expect services that cannot be provided by the NPN (such as IMS services) to be transmitted in PLMN PDU sessions, and expect other services (such as services other than IMS services) to be transmitted in NPN PDU sessions. On such a basis, a mechanism is needed to control traffic of the NPN and the PLMN. For example, traffic of a specific service is transmitted via the PLMN, while other traffic is transmitted via the NPN. The technical solutions of the embodiments of the present disclosure will be described in detail below.

FIG. 3 is a flowchart illustrating a method for service transmission according to an embodiment of the present disclosure. As illustrated in FIG. 3, the method for service transmission includes the following operations.

In block 301, a terminal device obtains first policy information and second policy information. The first policy information is used for transmitting first service data in a session established between the terminal device and a first core network element. The second policy information is used for transmitting second service data in a session established between the terminal device and a second core network element. Transmission nodes of the session established between the terminal device and the second core network element include the first core network element.

In this embodiment of the present disclosure, a session established between the terminal device and the first core network element is referred to as a first session, and a session established between the terminal device and the second core network element is referred to as a second session. Through the use of the first policy information and the second policy information, the first service data is transmitted in the first session and the second service data is transmitted in the second session.

In this embodiment of the present disclosure, the first core network element and the second core network element belong to different types of networks. In at least one embodiment, the first core network element belongs to the NPN, and the second core network element belongs to the PLMN.

In at least one implementation of the present disclosure, the first core network element is a User Plane Function (UPF) network element on the NPN side, which is referred to as an NPN UPF for short. The second core network element is a UPF on the PLMN side, which is referred to as a PLMN UPF for short.

In this embodiment of the present disclosure, for traffic interacted between the terminal device and the network, in order to allow part of the traffic to go through the NPN UPF and another part of the traffic to go through the PLMN UPF, the terminal device needs to use two sets of policy information, i.e., the first policy information and the second policy information. Here, the first policy information is policy information on the NPN side, and the second policy information is policy information on the PLMN side. Specific implementations of the first policy information and the second policy information will be described below.

Traffic Control Through URSP Rules

Here, URSP stands for UE Route Selection Policy. A URSP includes a number of URSP rules. Each URSP rule can include one or more Route Selection Descriptors (RSDs).

The URSP may be used in such a manner that the terminal device associates, based on the URSP, service data to a corresponding session for transmission. The mechanism is as follows.

When the service data appears at an application layer, the terminal device uses the URSP rules in the URSP to check whether characteristics of the service data match a traffic descriptor of a certain URSP rule in the URSP. The order of checking is determined in accordance with precedence of traffic descriptors in the URSP rules. That is, the terminal device checks matching in sequence based on the order of precedence. When a URSP rule is matched, the terminal device searches for a suitable session based on the precedence order of one or more RSDs under the URSP rule. Here, the RSD with higher precedence is used in preference. If a parameter in the RSD can take one or more values, the terminal device selects one value from the one or more values and uses the value in combination with other parameters to find whether a session exists.

1) When the session exists, the service data is bound to the session for transmission.

2) When the session does not exist, an establishment of the session is triggered. Further, the following operation is performed.

2.1) If the session is successfully established, the service data is bound to the session for transmission.

2.2) If the session is not successfully established, it is checked again whether the PDU session exists based on a combination of other parameters in the RSD or using a combination of parameters in an RSD at lower precedence (repeat operation 1)).

If a suitable session for binding cannot be found based on the matched URSP rule, the terminal device may search for the traffic descriptor in the URSP rule at lower precedence based on the precedence order to check whether the traffic descriptor in the URSP rule at lower precedence can match the characteristics of the service data. When the traffic descriptor in the URSP rule at lower precedence can match the characteristics of the service data, the process described above is repeated.

The above process of searching for a suitable session for the service data is called "evaluation" in the present disclosure.

In this embodiment of the present disclosure, the first policy information includes at least one first URSP rule, and the second policy information includes at least one second URSP rule.

Here, the at least one first URSP rule may be referred to as a first set of URSP rules, and the at least one second URSP rule may be referred to as a second set of URSP rules. Here, the first set of URSP rules refers to at least one URSP rule on the NPN side, and the second set of URSP rules refers to at least one URSP rule on the PLMN side.

Referring to FIG. 4A, the first service data is transmitted between the UE and the NPN UPF (i.e., the first service data is transmitted via the NPN), and the second service data is transmitted between the UE and the PLMN UPF (i.e., the second service data is transmitted via the PLMN). In an example, the second service data is service data not supported by the NPN (such as IMS service data), and the first service data is service data supported by the NPN (such as service data other than the IMS service data).

In this embodiment of the present disclosure, the terminal device determines, based on target policy information, that the first service data is transmitted in the first session and the second service data is transmitted in the second session. The target policy information includes the first policy information and the second policy information. In a specific implementation, the URSP rule(s) on the NPN side (i.e., the first set of URSP rules) can be used along with the URSP rule(s) on the PLMN side (i.e., the second set of URSP rules). Specifically, when the service data appears at the application layer, and the URSP rules need to be used to determine which session the service data is bound to, the following specific operation can be performed: 1) the URSP rule(s) on the PLMN side can be used first for an evaluation, and then the URSP rule(s) on the NPN side can be used for an evaluation in case no suitable session is found; or, 2) the URSP rule(s) on the NPN side can be used first for an evaluation, and then the URSP rule(s) on the PLMN side can be used for an evaluation in case no suitable session is found; or, 3) the URSP rule(s) on the PLMN side and the URSP rule(s) on the NPN side can be mixed in a certain manner (such as based on precedence information of the URSP rules), and an evaluation can be made in accordance with the mixed URSP rules.

Through the above operation, it is implemented that the first service data is transmitted in the first session, and the second service data is transmitted in the second session. The first session is a session on the NPN side, and the second session is a session on the PLMN side. That is, it is implemented that the first service data is bound to the session on the NPN side (i.e., the NPN PDU session) for transmission, and the second service data is bound to the session on the PLMN side (i.e., the PLMN PDU session) for transmission, thereby achieving a purpose of limiting outlets of traffic.

It should be noted that the session on the NPN side or the session on the PLMN side involved in the embodiments of the present disclosure refers to that the NPN or the PLMN allocates context information for the session, and the session ends on the NPN UPF or PLMN UPF. That is, a session of the NPN is anchored at the NPN UPF, and a session of the PLMN is anchored at the PLMN UPF.

Traffic Control Through QoS Rules

In this embodiment of the present disclosure, the first policy information includes at least one first QoS rule, and the second policy information includes at least one second QoS rule.

Here, the at least one first QoS rule may be referred to as a first set of QoS rules, and the at least one second URSP rule may be referred to as a second set of QoS rules. Here, the first set of QoS rules refers to at least one QoS rule on the NPN side, and the second set of QoS rules refers to at least one QoS rule on the PLMN side.

Figure 4B:
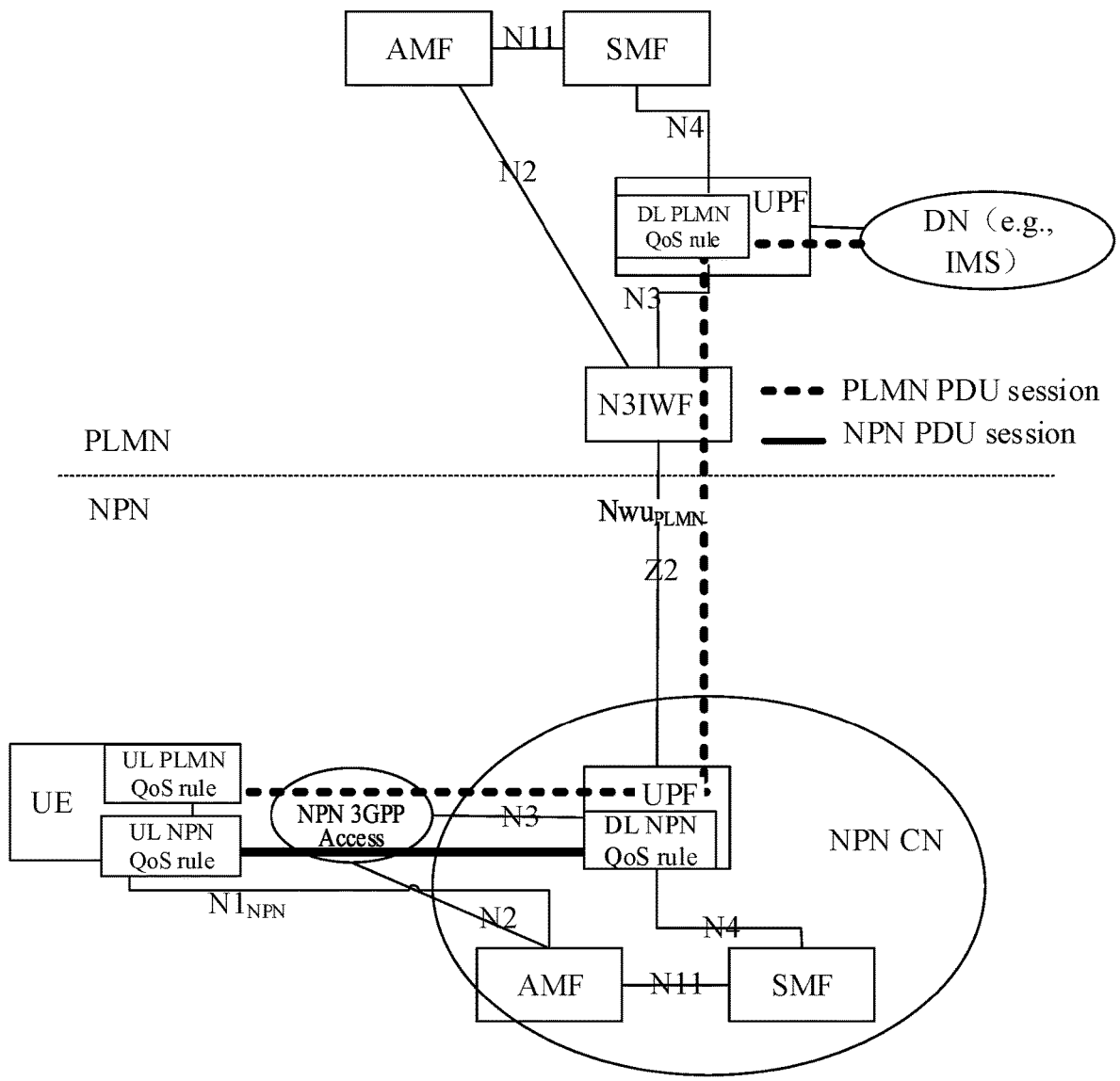
FIG. 4B is a schematic diagram showing traffic control based on a Quality of Service (QoS) rule according to an embodiment of the present disclosure.

Referring to FIG. 4B, the first service data is transmitted between the UE and the NPN UPF (i.e., the first service data is transmitted via the NPN), and the second service data is transmitted between the UE and the PLMN UPF (i.e., the second service data is transmitted via the PLMN). In an example, the second service data is the service data not supported by the NPN (e.g., the IMS service data), and the first service data is the service data supported by the NPN (e.g., the service data other than the IMS service data).

In this embodiment of the present disclosure, the terminal device determines based on the first policy information that the first service data is transmitted in the first session, and determines based on the second policy information that the second service data is transmitted in the second session. In a specific implementation, for the session on the NPN side (i.e., the NPN PDU session), the first set of QoS rules is configured; and for the session on the PLMN side (i.e., the PLMN PDU session), the second set of QoS rules is configured. For the UE, the first set of QoS rules and the second set of QoS rules are configured; for the NPN UPF, the first set of QoS rules is configured; and for the PLMN UPF, the second set of QoS rules is configured. In this way, the second service data (e.g., the IMS service data) will be discarded on the NPN UPF, and similarly, the first service data (e.g., the service data other than the IMS service data) will be discarded on the PLMN UPF.

In this embodiment of the present disclosure, the first policy information and the second policy information may be delivered to the terminal device in one of the following manners.

1) The first policy information is transmitted to the terminal device via a third core network element, and the second policy information is transmitted to the terminal device via a fourth core network element.

2) The first policy information and the second policy information are transmitted to the terminal device via the third core network element.

3) The first policy information and the second policy information are transmitted to the terminal device via the fourth core network element.

Here, the third core network element belongs to the NPN, and the fourth core network element belongs to PLMN. In at least one implementation, the third core network element is a PCF on the NPN side, which is referred to as an NPN PCF for short. The fourth core network element is a PCF on the PLMN side, which is referred to as a PLMN PCF for short.

In an example, the following may be used as the URSP rules: I) a URSP rule on the PLMN side issued by the PLMN PCF, and a URSP rule on the NPN side issued by the NPN PCF; or, II) a URSP rule on the PLMN side issued by the PLMN PCF and a URSP rule on the NPN side issued by the PLMN PCF; or, III) a URSP rule on the NPN side issued by the NPN PCF and a URSP rule on the PLMN side issued by the NPN PCF.

In another example, the following may be used as the QoS rules: I) a QoS rule on the PLMN side issued by the PLMN PCF (or the QoS rule of the PLMN PDU session), and a QoS rule on the NPN side issued by the NPN PCF (or the QoS rule of the NPN PDU session).

In at least one implementation of the present disclosure, in order for the PLMN to issue a correct parameter (such as the URSP rule, the QoS rule, a QoS parameter, etc.), the terminal device transmits first indication information to the PLMN. The first indication information is used for indicating that the terminal device accesses the PLMN via the NPN. In at least one embodiment, the first indication information may be 1) explicit indication information, or 2) NPN identifier information (such as PLMN ID+Network Identifier (NID), PLMN ID+Cell Access Group Identifier (CAG ID)).

Further, the terminal device transmits the first indication information to a control plane network element of the PLMN through a Non-Access Stratum (NAS) message. The first indication information is used by the control plane network element for delivering related parameters of a user of the terminal device, e.g., at least one of a URSP rule, a QoS rule, and a QoS parameter, to the terminal device based on the first indication information. In at least one embodiment, the NAS message is a registration request message, a session establishment request message, or a session modification request message.

Here, the control plane network element of the PLMN is the PCF on the PLMN side (referred to as the PLMN PCF for short) or the UDM on the PLMN side (referred to as the PLMN UDM for short). The PLMN PCF or the PLMN UDM issues a correct rule or parameter (e.g., the URSP rule, the QoS rule, and the QoS parameter) based on the first indication information.

Figure 5A:
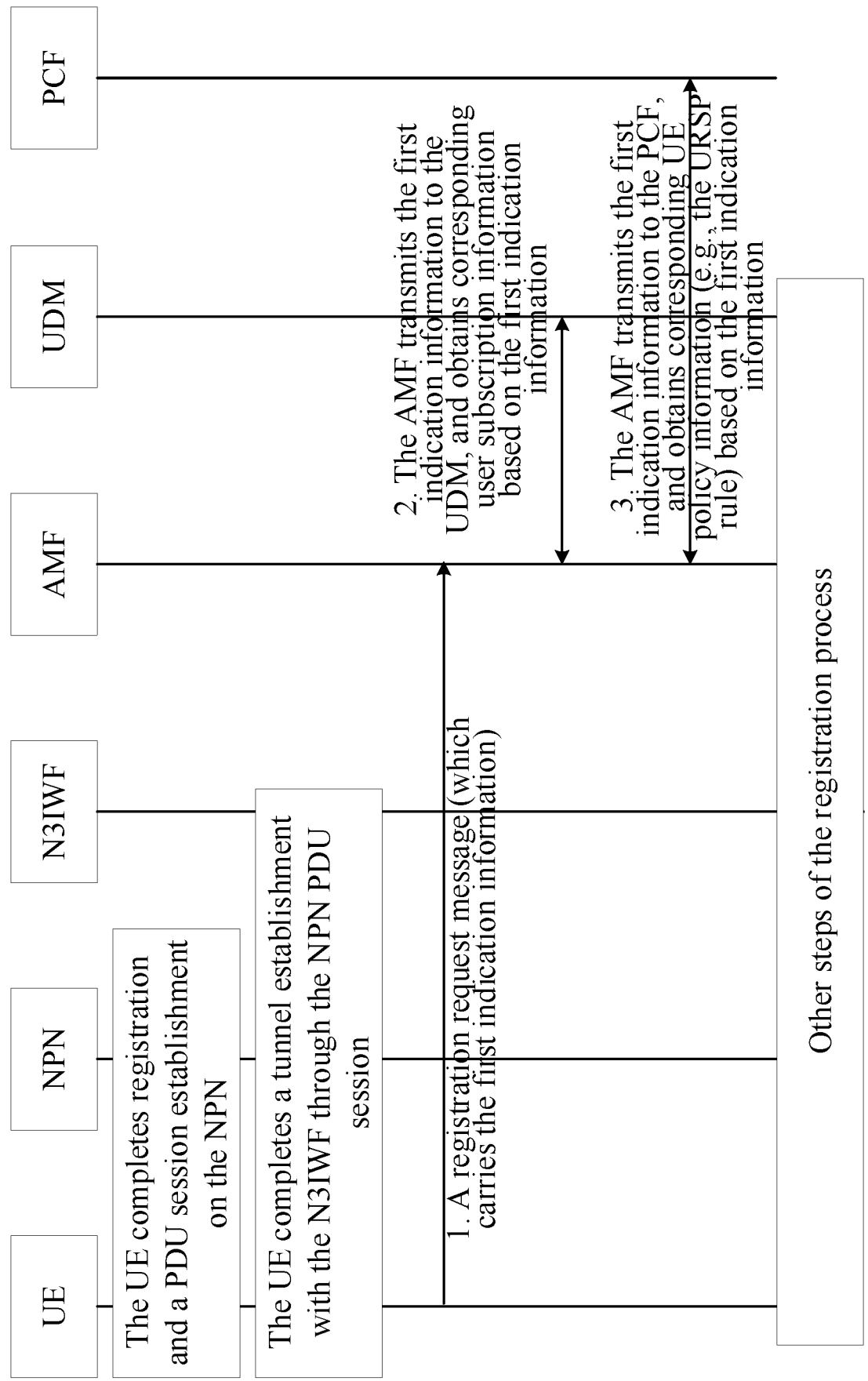
FIG. 5A is a flowchart illustrating a registration process according to an embodiment of the present disclosure.

FIG. 5A illustrates a registration process. Referring to FIG. 5A, the UE completes registration and a PDU session establishment on the NPN in advance. The UE completes a tunnel establishment with the N3IWF through the NPN PDU session. After that, 1: the UE transmits a registration request message to the AMF, and the registration request message carries the first indication information; 2: the AMF transmits the first indication information to the UDM, and obtains corresponding user subscription information based on the first indication information; and 3: the AMF transmits the first indication information to the PCF, and obtains corresponding UE policy information (e.g., the URSP rule) based on the first indication information.

Figure 5B:
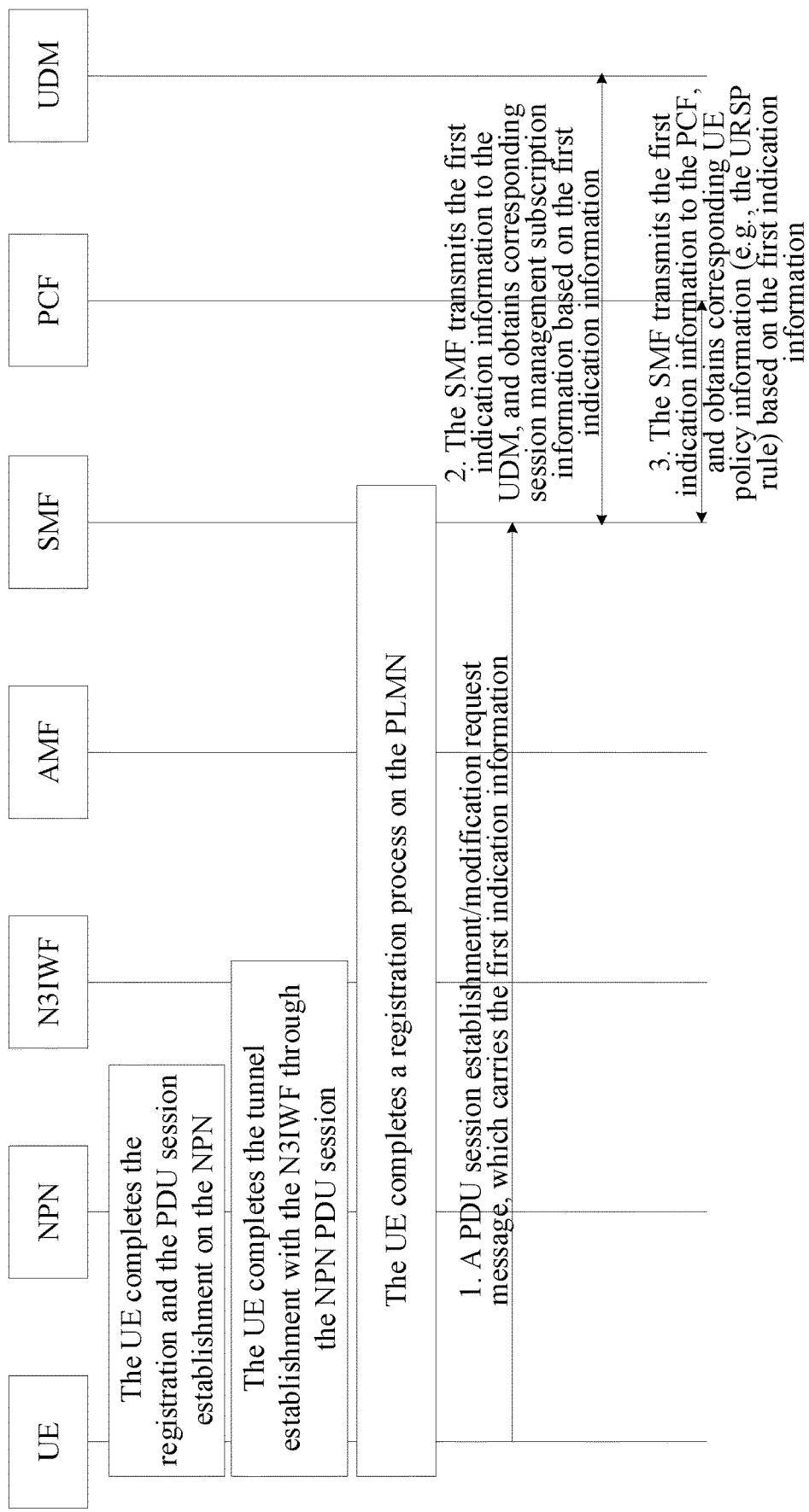
FIG. 5B is a flowchart illustrating a session establishment/modification process according to an embodiment of the present disclosure.

FIG. 5B illustrates a session establishment/modification process. Referring to FIG. 5B, the UE completes the registration and the PDU session establishment on the NPN in advance. The UE completes the tunnel establishment with the N3IWF through the NPN PDU session. The UE completes a registration process on the PLMN. After that, 1: the UE transmits a PDU session establishment/modification request message to the SMF, and the PDU session establishment/modification request message carries the first indication information; 2: the SMF transmits the first indication information to the UDM, and obtains corresponding user subscription information based on the first indication information; and 3: the SMF transmits the first indication information to the PCF, and obtains corresponding UE policy information (e.g., the URSP rule) based on the first indication information.

In at least one implementation of the present disclosure, the first policy information and/or the second policy information carries the first indication information. The terminal device transmits the first indication information to the PLMN based on the first indication information carried in the first policy information and/or the second policy information. Taking the URSP rule as an example, the first indication information is carried in the RSD under the URSP rule. Table 1 shows specific content of the URSP rule, and Table 2 shows specific content of the RSD. In this way, when transmitting the NAS message (e.g., the registration request message, or the session establishment request message, or the session modification request message) to the PLMN, the terminal device may determine whether to carry the first indication information in the NAS message.

TABLE 1

| URSP rule | | | |
|---|---|---|---|
| Information name | Description | The PCF allows modifications in UE context | Scope |
| Rule precedence | Determine a place of the URSP rule in the order of enforcing URSP rules in the UE | Yes | UE context |

TABLE 1-continued

| URSP rule | | | |
|---|---|---|---|
| Information name | Description | The PCF allows modifications in UE context | Scope |
| Traffic descriptor | This section defines the traffic descriptor of the policy | | |
| Application identifier | Application identifier | Yes | UE context |
| IP descriptor | An IP triple (target IP address or IPv6 network prefix, target port number, protocol ID of the protocol above IP) | Yes | UE context |
| Non-IP descriptor | Descriptor of non-IP traffic | Yes | UE context |
| RSD list | list of RSDs | | |

TABLE 2

| RSD | | | |
|---|---|---|---|
| Information name | Description | The PCF Allows modifications in UE context | Scope |
| RSD precedence | Determine a place of the RSD in the order of applying RSDs | Yes | UE context |
| Route selection components | This section defines the route selection components | | |
| Service and Session Continuity (SSC) mode selection | A single value of an SSC mode | Yes | UE context |
| Network slice selection | A single value or a list of values of Single-Network Slice Selection Assistance information (S-NSSAI) | Yes | UE context |
| Data Network Name (DNN) selection | A single value or a list of values of DNN(s) | Yes | UE context |
| Non-seamless offload indication | Indicates whether to offload the traffic of a matching application to a non-3GPP access outside of the PDU session | Yes | UE context |
| Access category precedence | When the UE establishes a PDU session for the matching application, it indicates a preferred access category (3GPP or non-3GPP or multiple access, etc.) | Yes | UE context |
| "First indication information" | Indicates that the terminal device accesses the PLMN via the NPN | | |
| "Second indication information" | Indicates whether a session determined by the RSD is a session on the NPN side or a session on the PLMN side | | |

In at least one implementation of the present disclosure, the terminal device may determine whether service data to be transmitted is bound to the first session (i.e., the NPN PDU session) or to the second session (i.e., the PLMN PDU session) in one of the following manners.

(A) Manner 1: the first policy information is not distinguished from the second policy information, and the second indication information is added to the policy information.

The first policy information and the second policy information belong to policy information in the target policy information. Entire or partial policy information in the target policy information carries the second indication information. The second indication information is used for indicating whether a session determined by the entire or partial policy information is the session on the NPN side or the session on the PLMN side.

For example, referring to Table 2, the second indication information is added to the RSD of the URSP rule. The second indication information is used for indicating whether the session determined by the RSD is a session on the NPN side or a session on the PLMN side (or whether the session determined by the RSD is established on the NPN or the PLMN). In this way, the terminal device determines, based on the second indication information, whether the service data matching the URSP rule should be transmitted in the PLMN PDU session or in the NPN PDU session. For example, when the second indication information in the RSD indicates that the session determined by the RSD is the session on the PLMN side, the terminal device uses the parameter in the RSD to transmit the NAS message to the PLMN, thereby establishing the PLMN PDU session on the PLMN and binding the service data to the PLMN PDU session, or binding the service data to the PDU session that has been established on the PLMN and conforms to the parameter in the RSD.

It should be noted that such a manner does not need to distinguish whether the URSP rule is the PLMN URSP rule or the NPN URSP rule.

(B) Manner 2: first policy information is distinguished from second policy information.

1) The first policy information carries first identifier information for indicating that the first policy information is policy information on the NPN side; and/or the second policy information carries second identifier information for indicating that the second policy information is policy information on the PLMN side.

Taking the URSP rule as an example, an NPN identifier (i.e., PLMN ID+NID) can be added to the URSP on the PLMN side to indicate the URSP rule on the PLMN side. In at least one embodiment, the NPN identifier can be added to a UE policy identifier of the URSP.

2) The terminal device determines based on third indication information that the first policy information is policy information on the NPN side and/or the second policy information is policy information on the PLMN side.

Here, the third indication information is used for indicating whether certain policy information is the policy information on the NPN side or the policy information on the PLMN side.

3) A value of a policy identifier of policy information on the NPN side belongs to a first value range, and a value of a policy identifier of policy information on the PLMN side belongs to a second value range. The terminal device determines that the first policy information is the policy information on the NPN side based on a policy identifier of the first policy information; and/or the terminal device determines that the second policy information is the policy information on the NPN side based on a policy identifier of the second policy information.

Figure 5C:
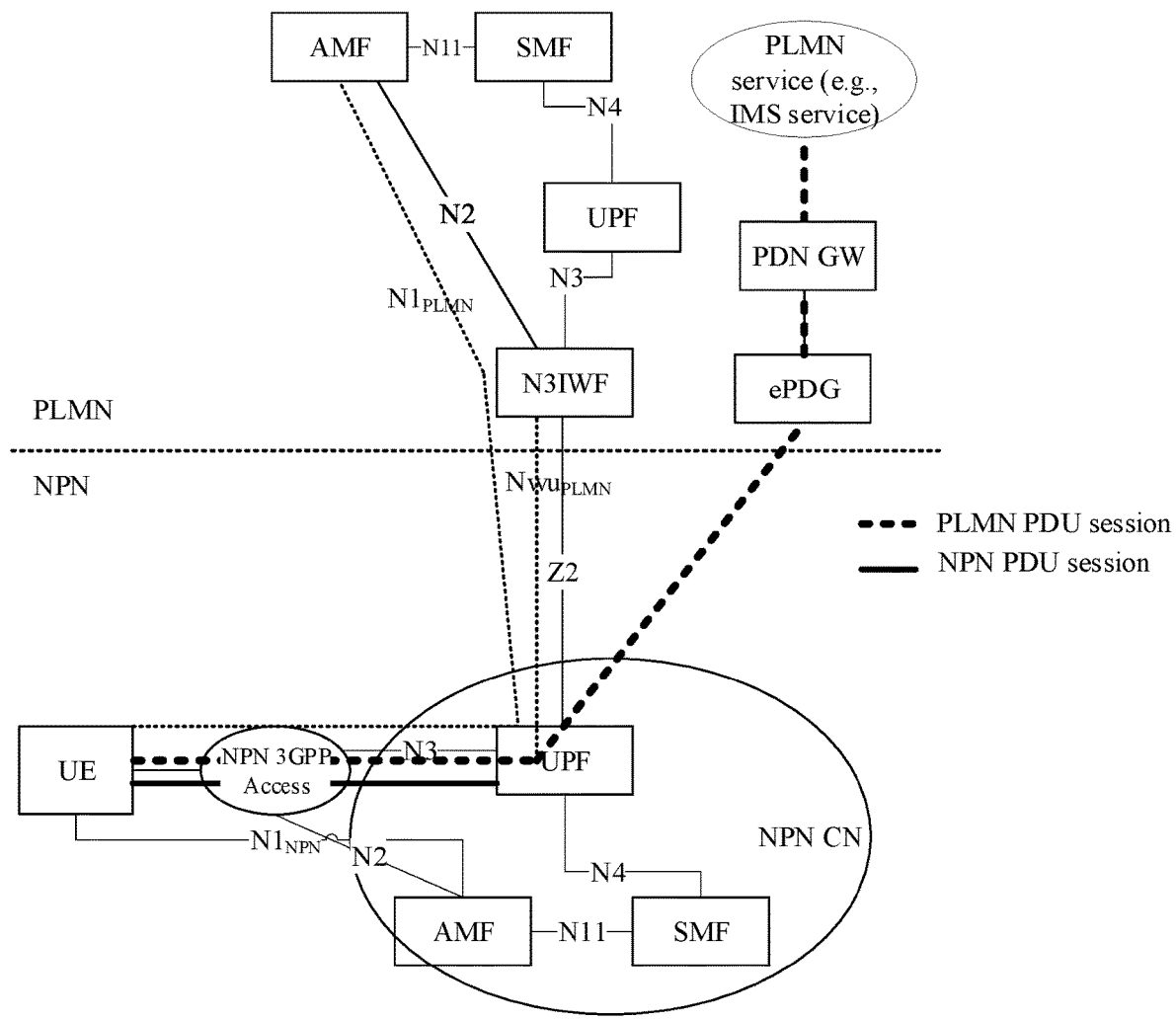
FIG. 5C is a second schematic diagram showing a User Equipment (UE) accessing a PLMN via an NPN according to an embodiment of the present disclosure.

According to the technical solutions of the embodiments of the present disclosure, not only the PLMN of a 5G Core (5GC) network can be accessed via the NPN, but also the PLMN of a 4G Core (i.e., Evolved Packet Core (EPC)) network can be accessed via the NPN. FIG. 5C shows a schematic diagram of accessing a PLMN of the EPC via the NPN. In this case, the UE establishes a secure tunnel with an enhanced Packet Data Gateway (ePDG) through the PDU session of the NPN, and establishes a Packet Data Network (PDN) connection of the EPC PLMN for performing IMS services. In this case, the EPC can also issue a specific QoS rule for the UE to implement management and control over service traffic of the PLMN. For example, only the IMS service data is allowed to pass. Here, it needs to be pointed out that an access via the ePDG under the EPC can only include an establishment of the PDN connection on a user plane without an establishment of the NAS connection on a control plane. In at least one embodiment, the UE may also carry the first indication information in a message transmitted to the EPC via the ePDG. The first indication information is used for indicating that the UE accesses the EPC PLMN via the NPN.

With the technical solutions according to the embodiments of the present disclosure, it is implemented that the terminal device may borrow the PLMN to perform services that cannot be supported by the NPN while effectively managing and controlling the terminal device not to use the PLMN to perform services other than a designated service (such as the IMS service). The technical solutions according to the embodiments of the present disclosure make full use of existing constructions and mechanisms, are easy to implement, and have little impact on an existing architecture.

Figure 6:
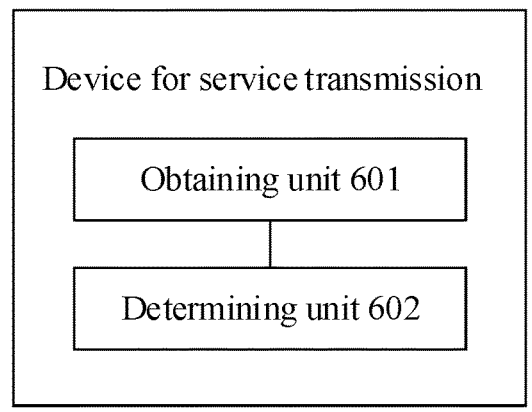
FIG. 6 is a schematic diagram showing a structure of a device for service transmission according to an embodiment of the present disclosure.

FIG. 6 is a schematic diagram showing a structure of a device for service transmission according to an embodiment of the present disclosure. As illustrated in FIG. 6, the device for service transmission includes an obtaining unit 601.

The obtaining unit 601 is configured to obtain first policy information and second policy information. The first policy information is used for transmitting first service data in a session established between a terminal device and a first core network element. The second policy information is used for transmitting second service data in a session established between the terminal device and a second core network element. Transmission nodes of the session established between the terminal device and the second core network element include the first core network element.

In at least one implementation, the first core network element and the second core network element belong to different types of networks.

In at least one implementation, the first core network element belongs to an NPN, and the second core network element belongs to a PLMN.

In at least one implementation, the first policy information includes at least one first URSP rule, and the second policy information includes at least one second URSP rule.

In at least one implementation, the first policy information includes at least one first QoS rule, and the second policy information includes at least one second QoS rule.

In at least one implementation, the first policy information is transmitted to the terminal device by a third core network element, and the second policy information is transmitted to the terminal device by a fourth core network element; or the first policy information and the second policy information are transmitted to the terminal device by the third core network element; or the first policy information and the second policy information are transmitted to the terminal device by the fourth core network element. The third core network element belongs to an NPN, and the fourth core network element belongs to a PLMN.

In at least one implementation, the device further includes a transmitting unit (not illustrated in the figure). The transmitting unit is configured to transmit first indication information to a PLMN. The first indication information is used for indicating that the terminal device accesses the PLMN via an NPN.

In at least one implementation, the transmitting unit is configured to transmit the first indication information to a control plane network element of the PLMN through a NAS message. The first indication information is used by the control plane network element for delivering at least one of a URSP rule, a QoS rule, and a QoS parameter to the terminal device based on the first indication information.

In at least one implementation, the NAS message is a registration request message, a session establishment request message, or a session modification request message.

In at least one implementation, the first policy information and/or the second policy information carries the first indication information. The transmitting unit is configured to transmit the first indication information to the PLMN based on the first indication information carried in the first policy information and/or the second policy information.

In at least one implementation, the first service data is transmitted in a first session, and the second service data is transmitted in a second session. The first session is a session on an NPN side, and the second session is a session on a PLMN side.

In at least one implementation, the device further includes a determining unit 602. The determining unit 602 is configured to determine, based on target policy information, that the first service data is transmitted in the first session and the second service data is transmitted in the second session. The target policy information includes the first policy information and the second policy information. Alternatively, the determining unit 602 is configured to determine, based on the first policy information, that the first service data is transmitted in the first session, and determine, based on the second policy information, that the second service data is transmitted in the second session.

In at least one implementation, entire or partial policy information in the target policy information carries second indication information. The second indication information is used for indicating whether a session determined by the entire or partial policy information is the session on the NPN side or the session on the PLMN side.

In at least one implementation, the first policy information carries first identifier information for indicating that the first policy information is policy information on the NPN side; and/or the second policy information carries second identifier information for indicating that the second policy information is policy information on the PLMN side.

In at least one implementation, the device further includes a determining unit 602. The determining unit 602 is configured to determine, based on third indication information, that the first policy information is policy information on the NPN side and/or the second policy information is policy information on the PLMN side.

In at least one implementation, a value of a policy identifier of policy information on the NPN side belongs to a first value range, and a value of a policy identifier of policy information on the PLMN side belongs to a second value range. The device further includes a determining unit 602 configured to: determine that the first policy information is the policy information on the NPN side based on a policy identifier of the first policy information; and/or determine that the second policy information is the policy information on the NPN side based on a policy identifier of the second policy information.

A person skilled in the art should understand that the above relevant description of the device for service transmission according to embodiments of the present disclosure can be understood with reference to relevant description of the method for service transmission according to embodiments of the present disclosure.

Figure 7:
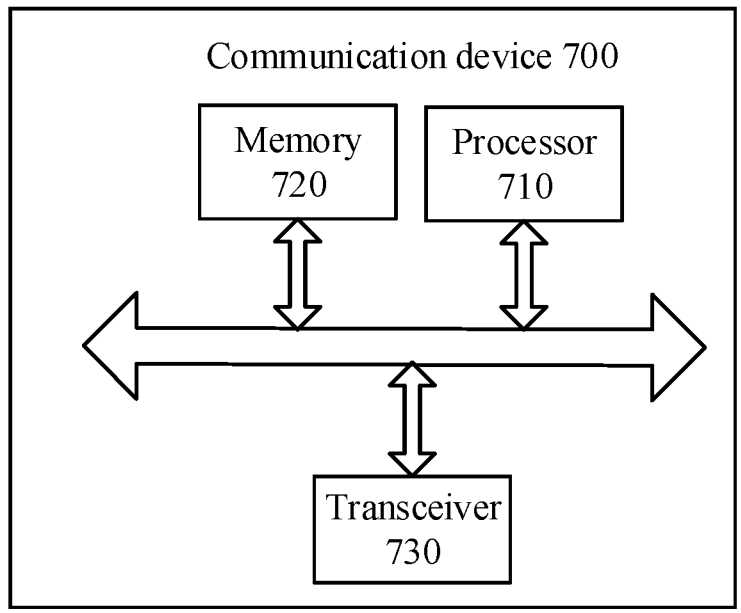
FIG. 7 is a schematic diagram showing a structure of a communication device according to an embodiment of the present disclosure.

FIG. 7 is a schematic diagram showing a structure of a communication device 700 according to an embodiment of the present disclosure. The communication device can be a terminal device or a network device. The communication device 700 illustrated in FIG. 7 includes a processor 710. The processor 710 is configured to invoke and run a computer program from a memory to perform the method according to any of the embodiments of the present disclosure.

In at least one embodiment, as illustrated in FIG. 7, the communication device 700 may further include a memory 720. The processor 710 may invoke and run a computer program from the memory 720 to perform the method according to any of the embodiments of the present disclosure.

Here, the memory 720 may be a separate component independent of the processor 710, or may be integrated in the processor 710.

In at least one embodiment, as illustrated in FIG. 7, the communication device 700 may further include a transceiver 730. The processor 710 may control the transceiver 730 to communicate with other devices, specifically, to transmit information or data to other devices, or receive information or data transmitted by other devices.

Here, the transceiver 730 may include a transmitter and a receiver. The transceiver 730 may further include one or more antennas.

In at least one embodiment, the communication device 700 may specifically be a network device according to an embodiment of the present disclosure. The communication device 700 may execute corresponding processes implemented by the network device in the method according to any of the embodiments of the present disclosure. For brevity, details thereof will be omitted herein.

In at least one embodiment, the communication device 700 may specifically be a mobile terminal/terminal device according to an embodiment of the present disclosure. The communication device 700 may execute corresponding processes implemented by the mobile terminal/terminal device in the method according to any of the embodiments of the present disclosure. For brevity, details thereof will be omitted herein.

Figure 8:
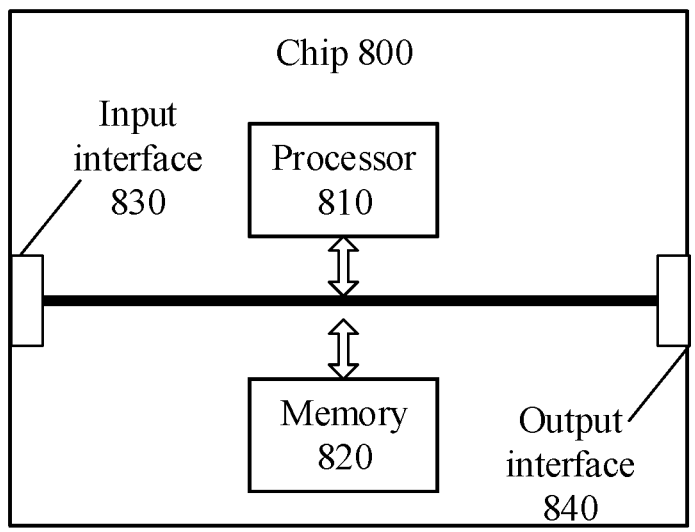
FIG. 8 is a schematic diagram showing a structure of a chip according to an embodiment of the present disclosure.

FIG. 8 is a schematic diagram showing a structure of a chip according to an embodiment of the present disclosure. A chip 800 illustrated in FIG. 8 includes a processor 810. The processor 810 can invoke and run a computer program from a memory to perform the method according to any of the embodiments of the present disclosure.

In at least one embodiment, as illustrated in FIG. 8, the chip 800 may further include a memory 820. The processor 810 may invoke and run a computer program from the memory 820 to perform the method according to any of the embodiments of the present disclosure.

Here, the memory 820 may be a separate component independent of the processor 810, or may be integrated in the processor 810.

In at least one embodiment, the chip 800 may further include an input interface 830. The processor 810 can control the input interface 830 to communicate with other devices or chips, specifically, to obtain information or data transmitted by other devices or chips.

In at least one embodiment, the chip 800 may further include an output interface 840. The processor 810 can control the output interface 840 to communicate with other devices or chips, specifically, to output information or data to other devices or chips.

In at least one embodiment, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

In at least one embodiment, the chip can be applied to the mobile terminal/terminal device according to any of the embodiments of the present disclosure. The chip can implement corresponding processes implemented by the mobile terminal/terminal device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

Figure 9:
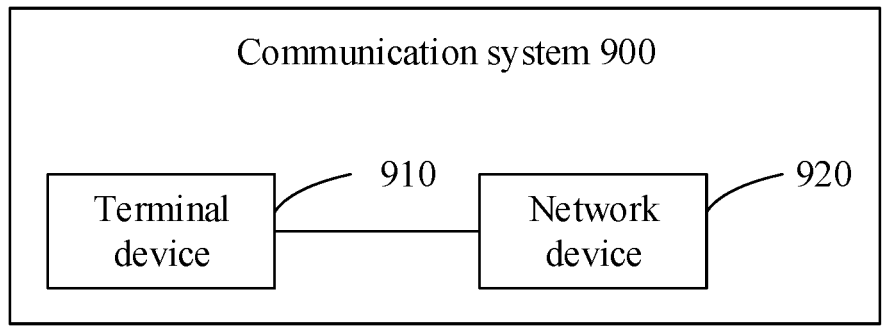
FIG. 9 is a schematic block diagram of a communication system according to an embodiment of the present disclosure.

FIG. 9 is a schematic block diagram of a communication system 900 according to an embodiment of the present disclosure. As illustrated in FIG. 9, the communication system 900 includes a terminal device 910 and a network device 920.

Here, the terminal device 910 can be configured to implement the corresponding functions implemented by the terminal device in the above method. The network device 920 can be configured to implement corresponding functions implemented by the network device in the above method. For brevity, repeated description is omitted herein.

It is to be noted that the processor in the embodiment of the present disclosure may be an integrated circuit chip with signal processing capability. In an implementation, the operations of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, operations, and logical block diagrams disclosed in the embodiments of the present disclosure can be implemented or performed. The general purpose processor may be a microprocessor or any conventional processor. The operations of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the operations of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. By way of illustration, rather than limitation, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

Figure 10:
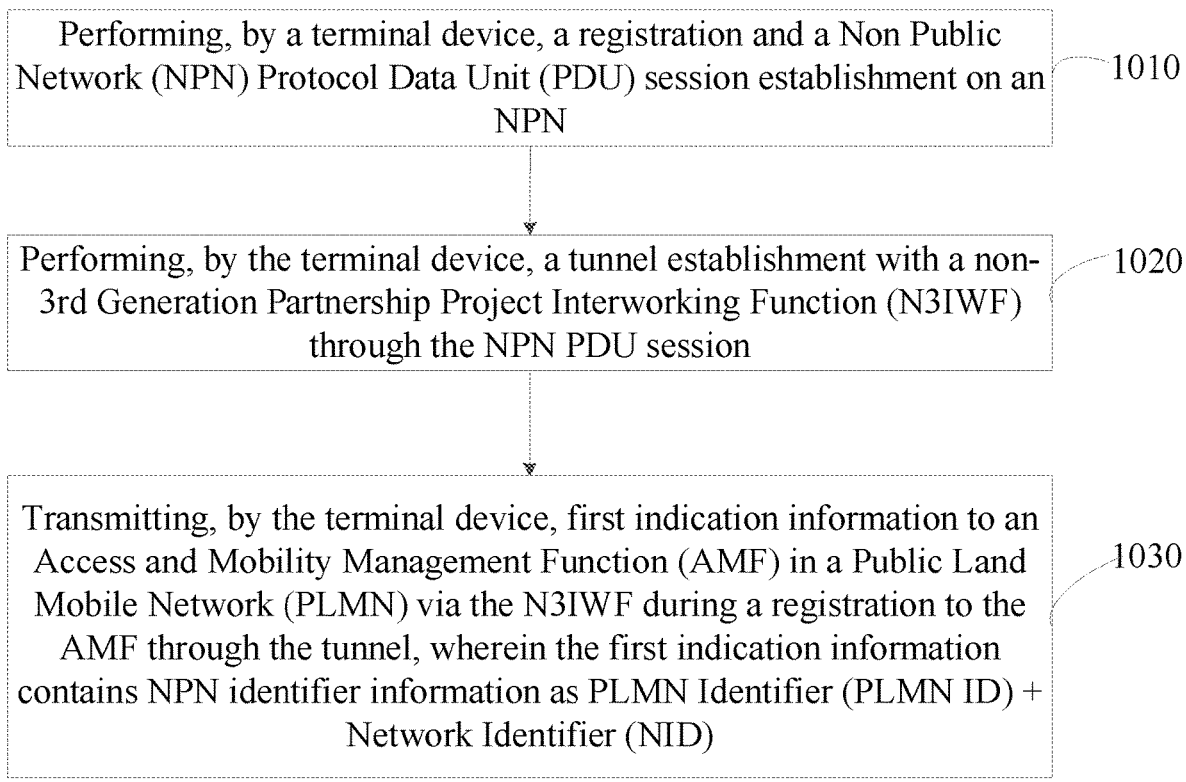
FIG. 10 is flowchart illustrating a method for service transmission according to another embodiment of the present disclosure.

FIG. 10 is a flowchart illustrating a method for service transmission according to another embodiment of the present disclosure. As illustrated in FIG. 10, the method for service transmission includes the following operations.

In block 1010, a terminal device performs a registration and a NPN PDU session establishment on an NPN.

In block 1020, the terminal device performs a tunnel establishment with a N3IWF through the NPN PDU session.

In block 1030, the terminal device transmits first indication information to an AMF in a PLMN via the N3IWF during a registration to the AMF through the tunnel. The first indication information contains NPN identifier information as PLMN ID+NID.

In an embodiment, the method may further include obtaining, by the terminal device from the PLMN, at least one of policy information and a QoS parameter, which are delivered by the PLMN based on the first indication information.

Figure 11:
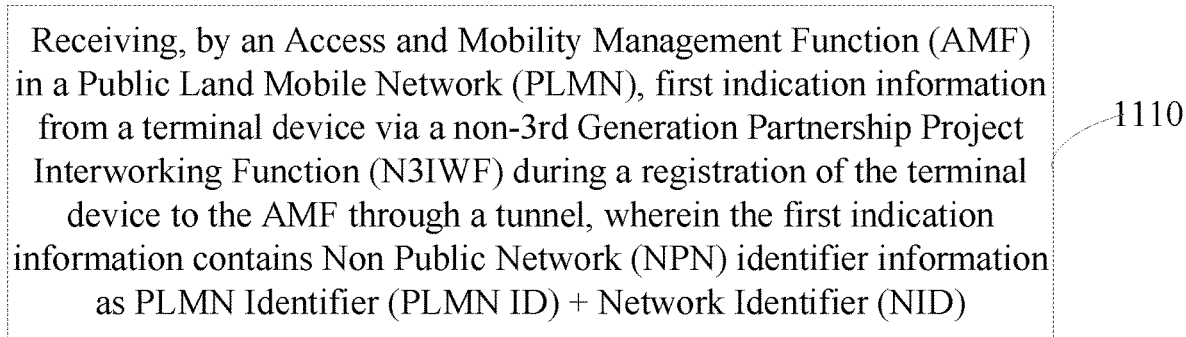
FIG. 11 is flowchart illustrating a method for service transmission according to a further embodiment of the present disclosure.

FIG. 11 is a flowchart illustrating a method for service transmission according to another embodiment of the present disclosure. As illustrated in FIG. 11, the method for service transmission includes the following operations.

In block 1110, an AMF in a PLMN receives first indication information from a terminal device via an N3IWF during a registration of the terminal device to the AMF through a tunnel. The first indication information contains NPN identifier information as PLMN ID+NID, The tunnel is established between the terminal device and the N3IWF through an NPN PDU session. The NPN PDU session is established through a registration and an NPN PDU session establishment by the terminal device on an NPN.

In an embodiment, the method may further include transmitting, by the AMF, the first indication information to a UDM of the PLMN, wherein user subscription information is obtained based on the first indication information.

In an embodiment, the method may further include transmitting, by the AMF, the first indication information to a PCF of the PLMN, wherein the at least one of the policy information and the QoS parameter is obtained based on the first indication information.

For details of terms and operations in the above methods, reference can be made to the description of FIG. 5A and FIG. 3. No repetition will be made here to avoid redundancy.

Also, the above methods can be implemented by the communication device, the chip and the communication system illustrated in FIGS. 7-9 respectively.

An embodiment of the present disclosure also provides a computer-readable storage medium for storing a computer program.

In at least one embodiment, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In at least one embodiment, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

In at least one embodiment, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

In at least one embodiment, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

In at least one embodiment, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In at least one embodiment, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm operations in the examples described in connection with the embodiments disclosed herein can be implemented in electronic hardware or any combination of computer software and electronic hardware. Whether these functions are executed by hardware or software depends on specific applications and design constraints of the technical solutions. Those skilled in the art may use different methods for each specific application to implement the described functions, and such implementation is to be encompassed by the scope of this disclosure.

Those skilled in the art can clearly understand that, for the sake of convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the essence of the technical solutions, namely, the part of the technical solutions that contributes to the prior art, can be embodied in the form of a software product. The computer software product may be stored in a storage medium and contain instructions to enable a computer device, such as a personal computer, a server, or a network device, etc., to perform all or part of the operations of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protection scope of the present disclosure is not limited to these embodiments. Various variants and alternatives can be easily conceived by any of those skilled in the art without departing from the technical scope of the present disclosure. Therefore, these variants and alternatives are to be encompassed by the protection scope of present disclosure as defined by the claims as attached.

What is claimed is:

1. A method for service transmission, comprising:
    performing, by a terminal device, a registration and a Non Public Network (NPN) Protocol Data Unit (PDU) session establishment on an NPN;

performing, by the terminal device, a tunnel establishment with a non-3rd Generation Partnership Project Interworking Function (N3IWF) through the NPN PDU session;

transmitting, by the terminal device, first indication information to an Access and Mobility Management Function (AMF) in a Public Land Mobile Network (PLMN) via the N3IWF during a registration to the AMF through the tunnel, wherein the first indication information contains NPN identifier information as PLMN Identifier (PLMN ID)+Network Identifier (NID), indicating that the terminal device accesses the PLMN via the NPN; and obtaining, by the terminal device from the PLMN, at least one of policy information and a Quality of Service (Qos) parameter, which is delivered by the PLMN based on the first indication information indicating that the terminal device accesses the PLMN via the NPN, wherein the method further comprises:

transmitting, by the terminal device via a PLMN PDU session, service data of a service unsupportable by the NPN, based on the at least one of the policy information and the Quality of Service (Qos) parameter, obtaining, by the terminal device from the NPN, at least one of additional policy information and an additional QoS parameter, and transmitting, by the terminal device via an NPN PDU session, service data of a service supportable by the NPN, based on the at least one of the additional policy information and the additional QoS parameter.

2. The method according to claim 1, wherein the policy information comprises at least one of a User equipment Route Selection Policy (URSP) rule, and a Quality of Service (Qos) rule.

3. The method according to claim 1, wherein
said obtaining, by the terminal device from the PLMN, the at least one of the policy information and the QoS parameter comprises: obtaining the at least one of the policy information and the Qos parameter from a control plane network element of the PLMN, and the at least one of the policy information and the QoS parameter is delivered by the control plane network element of the PLMN based on the first indication information.

4. The method according to claim 3, wherein the control plane network element of the PLMN is a PLMN Policy Control Function (PCF) network element or a PLMN Unified Data Management (UDM) network element.

5. The method according to claim 1, wherein
the first indication information is transmitted by the AMF to a UDM of the PLMN, and user subscription information is obtained based on the first indication information.

6. The method according to claim 1, wherein
the first indication information is transmitted by the AMF to a PCF of the PLMN, and the at least one of the policy information and the QoS parameter is obtained based on the first indication information.

7. An Access and Mobility Management Function (AMF) device, comprising a processor, and a memory for storing a computer program, wherein the processor is configured to invoke and run the computer program stored in the memory to perform operations comprising:

receiving, by the AMF in a Public Land Mobile Network (PLMN), first indication information from a terminal device via a non-3rd Generation Partnership Project Interworking Function (N3IWF) during a registration of the terminal device to the AMF through a tunnel, wherein the first indication information contains Non Public Network (NPN) identifier information as PLMN Identifier (PLMN ID)+Network Identifier (NID), indicating that the terminal device accesses the PLMN via an NPN, wherein the tunnel is established between the terminal device and the N3IWF through an NPN Protocol Data Unit (PDU) session, the NPN PDU session is established through a registration and an NPN PDU session establishment by the terminal device on an NPN, and at least one of policy information and a Quality of Service (Qos) parameter is delivered by the PLMN to the terminal device based on the first indication information indicating that the terminal device accesses the PLMN via the NPN, wherein service data of a service unsupportable by the NPN is transmitted by the terminal device via a PLMN PDU session, based on the at least one of the policy information and the Quality of Service (Qos) parameter, at least one of additional policy information and an additional QoS parameter is obtained by the terminal device from the NPN, and service data of a service supportable by the NPN is transmitted by the terminal device via an NPN PDU session, based on the at least one of the additional policy information and the additional QoS parameter.

8. The AMF device according to claim 7, wherein the policy information comprises at least one of a User equipment Route Selection Policy (URSP) rule, and a Quality of Service (Qos) rule.

9. The AMF device according to claim 7, wherein the operations further comprise:

transmitting, by the AMF, the first indication information to a Unified Data Management (UDM) of the PLMN, wherein user subscription information is obtained based on the first indication information.

10. The AMF device according to claim 7, wherein the operations further comprise transmitting, by the AMF, the first indication information to a Policy Control Function (PCF) of the PLMN, wherein the at least one of the policy information and the QoS parameter is obtained based on the first indication information.

11. A terminal device, comprising a processor, and a memory for storing a computer program, wherein the processor is configured to invoke and run the computer program stored in the memory to perform operations comprising:

performing a registration and a Non Public Network (NPN) Protocol Data Unit (PDU) session establishment on an NPN;

performing a tunnel establishment with a non-3rd Generation Partnership Project Interworking Function (N3IWF) through the NPN PDU session;

transmitting first indication information to an Access and Mobility Management Function (AMF) in a Public Land Mobile Network (PLMN) via the N3IWF during a registration to the AMF through the tunnel, wherein the first indication information contains NPN identifier information as PLMN Identifier (PLMN ID)+Network Identifier (NID), indicating that the terminal device accesses the PLMN via the NPN; and obtaining, from the PLMN, at least one of policy information and a Quality of Service (Qos) parameter, which is delivered by the PLMN based on the first indication information,
wherein the operations further comprise:
transmitting, via a PLMN PDU session, service data of a service unsupportable by the NPN, based on the at least one of the policy information and the Quality of Service (Qos) parameter,
obtaining, from the NPN, at least one of additional policy information and an additional Qos parameter, and
transmitting, via an NPN PDU session, service data of a service supportable by the NPN, based on the at least one of the additional policy information and the additional QoS parameter.

12. The terminal device according to claim 11, wherein the policy information comprises at least one of a User equipment Route Selection Policy (URSP) rule, and a Quality of Service (Qos) rule.

13. The terminal device according to claim 11, wherein said obtaining, from the PLMN, the at least one of the policy information and the QoS parameter comprises:

obtaining the at least one of the policy information and the QoS parameter from a control plane network element of the PLMN, and
the at least one of the policy information and the QoS parameter is delivered by the control plane network element of the PLMN based on the first indication information.

14. The terminal device according to claim 13, wherein the control plane network element of the PLMN is a PLMN Policy Control Function (PCF) network element or a PLMN Unified Data Management (UDM) network element.

15. The terminal device according to claim 11, wherein the first indication information is transmitted by the AMF to a UDM of the PLMN, and user subscription information is obtained based on the first indication information.

16. The terminal device according to claim 11, wherein the first indication information is transmitted by the AMF to a PCF of the PLMN, and the at least one of the policy information and the QoS parameter is obtained based on the first indication information.

* * * * *